(12) United States Patent
Le Beau

(10) Patent No.: US 7,128,514 B1
(45) Date of Patent: Oct. 31, 2006

(54) ADJUSTABLE AND REUSABLE STUD BOLT RETAINER

(75) Inventor: Howard Stephen Le Beau, Shelby, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 11/101,503

(22) Filed: Apr. 8, 2005

(51) Int. Cl.
F16B 37/08 (2006.01)
F16B 37/16 (2006.01)
F16B 39/04 (2006.01)
F16B 39/22 (2006.01)

(52) U.S. Cl. .................. 411/433; 411/437; 411/315; 411/278; 411/277

(58) Field of Classification Search .............. 411/522, 411/529, 525, 526, 528
See application file for complete search history.

(56) References Cited

U.S. PATENT DOCUMENTS

| | | | |
|---|---|---|---|
| 3,876,821 A * | 4/1975 | Pringle | 174/53 |
| 4,352,586 A * | 10/1982 | Hayden | 403/163 |
| 4,913,610 A * | 4/1990 | Olivieri | 411/352 |
| 5,390,882 A | 2/1995 | Lee et al. | |
| 5,423,647 A | 6/1995 | Suzuki | |
| 5,704,100 A * | 1/1998 | Swan | 24/656 |
| 5,760,338 A | 6/1998 | Suzuki | |
| 5,894,641 A * | 4/1999 | Hurtz et al. | 24/658 |
| 6,050,766 A * | 4/2000 | Kies et al. | 411/437 |
| 6,206,726 B1 | 3/2001 | Takahashi et al. | |
| 6,322,376 B1 | 11/2001 | Jetton | |
| 6,955,512 B1 * | 10/2005 | Allen et al. | 411/353 |

* cited by examiner

*Primary Examiner*—Robert J. Sandy
*Assistant Examiner*—David Reese
(74) *Attorney, Agent, or Firm*—Daniel R. Edelbrock

(57) ABSTRACT

A clip has a retainer for securing the clip and a wire harness to a bolt protruding from a vehicle surface. The retainer includes a beam having an aperture with an inner wall. The aperture receives the bolt. A flange projects into the aperture from the wall. An opening in the wall opposite the flange communicates with a passage in the beam. A sliding component of the retainer has a flanged end for insertion into the passage and through the beam into the aperture. The flange and the flanged end of the component are received between selected threads of the bolt to clamp the bolt in the aperture. Projections extending from opposite edges of the sliding component are received in cavities along side walls of the beam passage in positions corresponding to the size of the bolt. The projections and cavities cooperate to secure the sliding component in the beam.

12 Claims, 2 Drawing Sheets

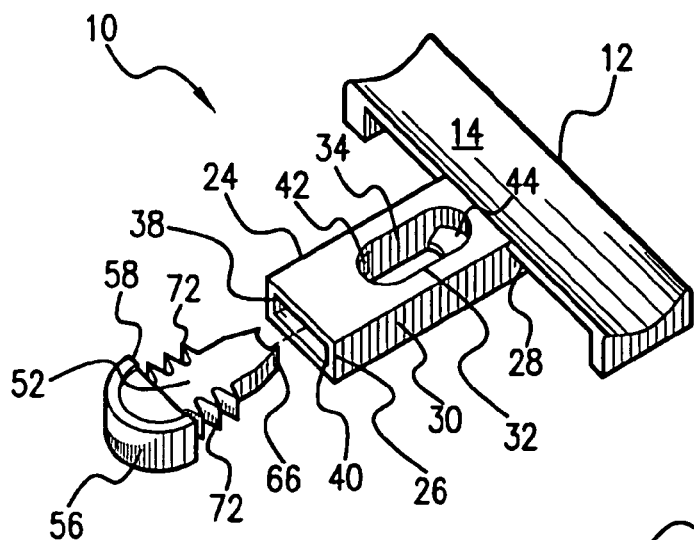
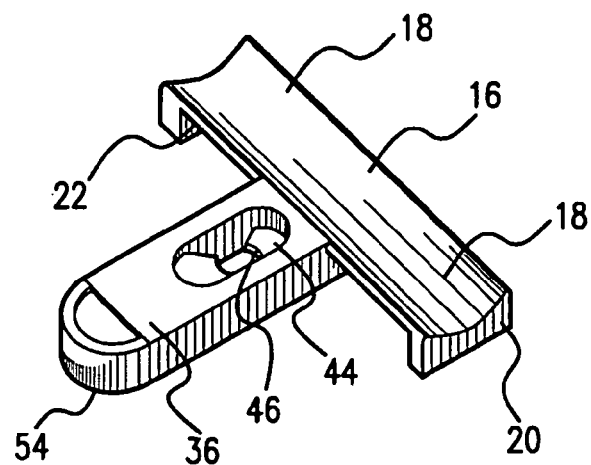
FIG. 1
FIG. 2
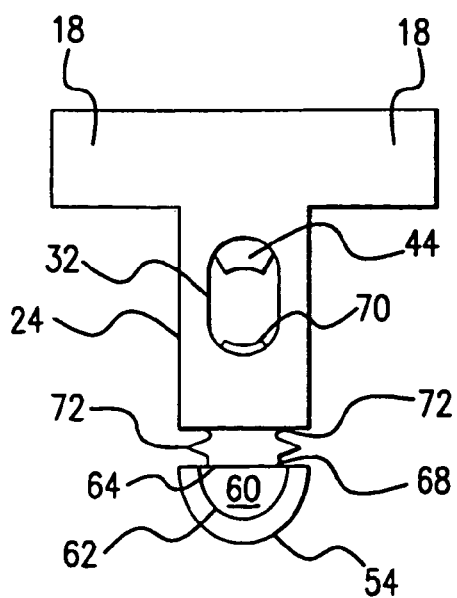
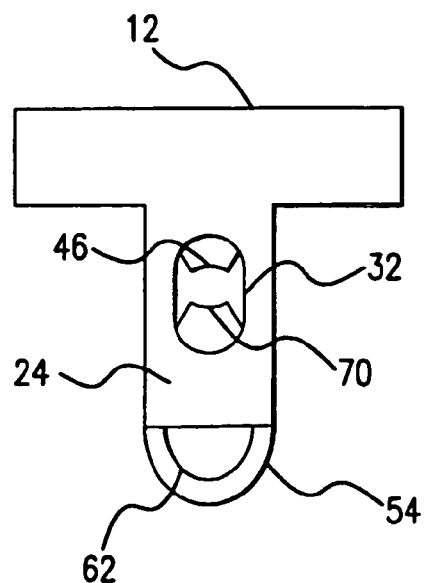
FIG. 3
FIG. 4

ADJUSTABLE AND REUSABLE STUD BOLT RETAINER

BACKGROUND OF THE INVENTION

1. Field of the Invention

The invention relates in general to clips for securing wire harnesses to vehicle surfaces, and more specifically to a clip with a stud bolt retainer that can accommodate different-sized stud bolts and can be removed from the stud bolt without damage to the retainer and clip.

2. Discussion of Related Art

One type of a conventional wire harness clip is shown in U.S. Pat. No. 5,390,882. The clip comprises an open, contoured or curved shell to which a wire harness can be taped. The shell is integral with a flat section forming a stud retainer. The retainer includes an aperture through the flat section and upward-angled, flexible, radial grippers extending into the aperture from its inner circumferential wall. A threaded weld stud protrudes from a vehicle body panel or other frame surface and is forced through the aperture, securing the clip and thereby the wire harness to the vehicle. The grippers are flexed or bent by the threads until they are engaged between selected threads and friction fit against the threads. The traditional shape of the threads and the angle and design of the radial grippers hinder removal of the retainer from the stud. The insertion force of the stud into the beam aperture is relatively high, since the flat section has to be forced onto the weld stud through and against the grippers. During disassembly, or the reverse of insertion, the grippers cannot flex as readily and may often be damaged, reducing the ability of the retainer to clamp against the stud properly or even preventing reuse of the clip. In addition, it is more than likely that a different clip having specifically-sized aperture and projections has to be provided for each stud size.

U.S. Pat. No. 5,760,338 discloses a wire harness clip that can be released from a stud or bolt and reused. Resilient members with teeth for engaging the threads of the stud have free ends extending away from each other. The free ends can be gripped and forced apart to separate the teeth from the threads, allowing removal of the clip from the stud. However, the clip cannot be adjusted for different-sized studs while maintaining optimal engagement of the teeth and threads. The resilient members are not locked into position around the stud and it appears that they can be inadvertently released from the stud if accidentally bumped or jostled.

Prior art attempts to provide a clip that accommodates different types of threads include U.S. Pat. No. 5,423,647. A claw arrangement in a retainer is designed to absorb variations in the bolt pitch and still provide a strong holding power. But the retainer does not adapt to variations in stud or bolt size and it seems that each claw must somehow be manually retracted from the threads before attempting to remove the retainer from the bolt.

SUMMARY OF THE INVENTION

Accordingly, it is an object of this invention to provide a stud retainer for a wire harness clip that can readily accommodate different-sized studs.

Another object of the invention is to enable the retainer to securely lock around the stud to guard against accidental release.

A further object of the invention is to allow the retainer to be removed from the stud without damage to the retainer and clip, thereby allowing reuse of the retainer and clip.

A still further object of the invention is to reduce the insertion force needed to mount a stud retainer to a stud bolt.

In carrying out this invention in the illustrative embodiment thereof, a wire harness clip has a stud retainer for attachment to a threaded bolt or stud extending from a vehicle body panel. The stud retainer comprises a substantially flat, elongated beam having a first, free end and a second end integral with the clip. An aperture extends through the beam adjacent the second end. A longitudinal passage through the beam has an open insertion end within the first end of the beam. An opposite end of the passage opens into the beam aperture along a circumference of the aperture. The passage has two sides. Shallow cavities extend into the beam from each side of the passage. Each cavity has a matching or corresponding cavity on the other side of the passage. Across the aperture from the passage opposite end is a flange element protruding into the aperture.

A separate, sliding component has a flange-shaped end for insertion into and through the passage from the first end of the beam, a middle part, and an opposite end formed into a grip or handle. Resilient locking fingers or projections spaced along the middle part snap into the cavities of the passage as the sliding component moves through the beam and the flange-shaped end of the sliding component enters the aperture directly across from, and in the same plane as, the flange element of the beam. The two flanges fit between selected threads of a stud, securing the retainer to the stud. The size of the stud determines the amount of insertion of the sliding component through the beam passage, and the multiplicity of the locking projections and receiving cavities allow the sliding component to be locked in any appropriate position.

The flange-shaped end of the sliding component can be set in positions accommodating multiple stud sizes. There is a reduction of insertion forces during assembly of the retainer on the stud because the flange-shaped end of the sliding component is not engaged until after stud insertion. The sliding component can be locked, but with some extra pushing or pulling force can be moved to different positions. Because of the resiliency of the locking projections, the sliding component can be removed from the aperture or released from the beam with no damage to the flange-shaped end, and then used again.

BRIEF DESCRIPTION OF THE DRAWINGS

This invention, together with other objects, features, aspects and advantages thereof, will be more clearly understood from the following description, considered in conjunction with the accompanying drawings.

FIG. 1 is an exploded perspective view of a wire harness clip with a stud retainer part according to the present invention.

FIG. 2 is a perspective view of the assembled clip and retainer part.

FIG. 3 is a top view of the assembled clip and retainer part with a sliding component of the retainer part in a partially inserted position to accommodate studs with larger diameters.

FIG. 4 is a top view of the assembled clip and retainer part with the sliding component in a fully inserted position to accommodate studs with smaller diameters.

DETAILED DESCRIPTION OF THE ILLUSTRATED EMBODIMENT

Figure 5:
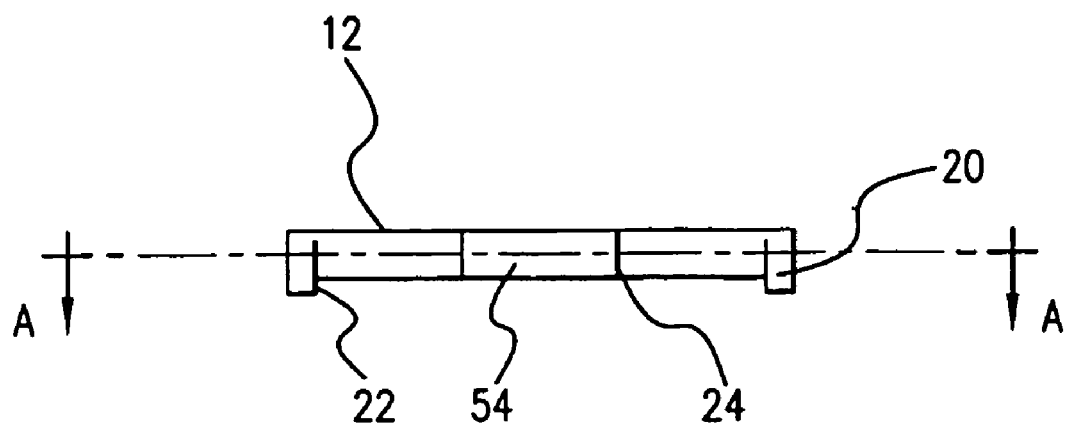
FIG. 5 is an end view of the stud retainer part and clip.

Referring now to FIGS. 1 and 2, a three-component wire harness clamp or clip 10 according to the present invention is illustrated. A first component is depicted as comprising a part or cradle 12 for supporting electrical wires. A dished or concave surface 14 of the cradle is directed upward as the clip is oriented in the Figures. The cradle 12 has a central portion 16 and two elongated arms 18 extending from the central portion. The elongated arms have end walls 20 directed perpendicularly downward from the concave surface 14 of the cradle, each end wall forming a lip 22 on an underside of the cradle. In use, a wire bundle or harness (not shown) is laid in the concavity of the cradle 12 and secured there by tape or tie straps wound around the arms 16 and the harness and confined by the lips 22. Other attachment means for securing the harness to the clip may be substituted for the cradle and tape.

A second component of the clip is a stud receiver or retainer part generally in the shape of a flat, rectangular beam 24. The beam 24 has a first, free end 26 and a second end 28, with long sides 30 of the beam extending between the ends. The second end 28 is integral with the central portion 16 of the cradle 12, and the length of the cradle is much larger than the width of the beam, such that beam 24 and cradle 12 form a T-shaped, one-piece structure. The arms 18, in other words, extend at right angles to the beam 24. The beam and cradle may, for example, be injection molded in one-piece from an electrically non-conductive plastic resin.

The beam 24 has a relatively large, oval-shaped aperture 32 with a long axis stretching along the length of the beam. The aperture 32 has an inside circumferential wall 34 within the beam. The aperture is located closer to the second end 28 than the first end 26, leaving a section 36 between the aperture and the first end 26 for partially receiving a third component of the clip 10. An inner slot or passage 38 extends through the section 36 from the first end 26 of the beam to the aperture 32. The passage 38 has an opening 40 at the first end 26 of the beam and a curved exit 42 along a portion of the circumferential wall 34 of the aperture 32. Directly across the aperture 32 from the passage curved exit 42 is a fixed flange 44 integral with the circumferential wall 34 of the aperture. The flange 44 has a semi-circular contact surface 46, curved inward relative to the flange and facing a center of the aperture.

Figure 6:
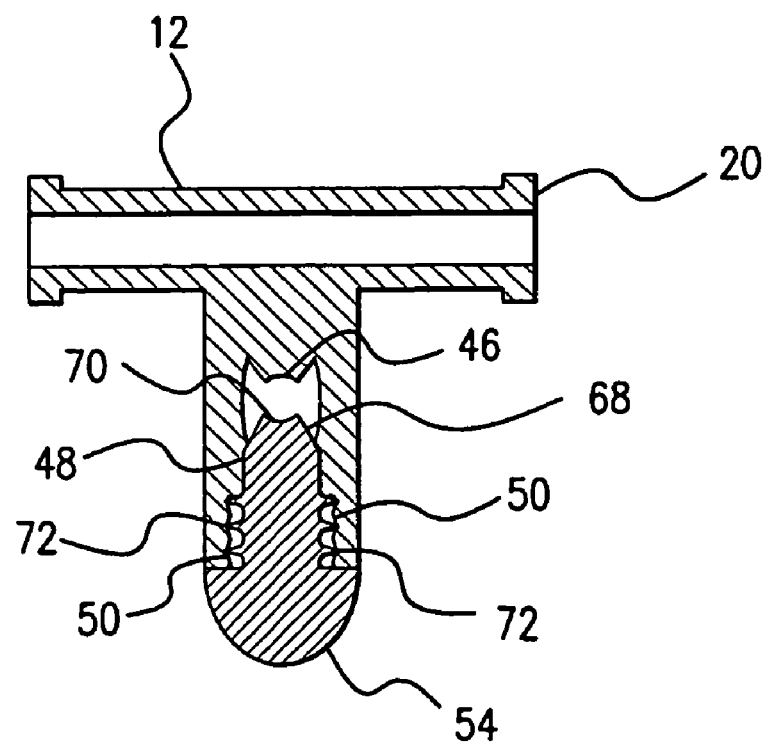
FIG. 6 is a cross-sectional top view of the assembled clip and retainer part taken along section line A—A of FIG. 5.

The passage 38 has inner side walls 48, illustrated in FIG. 6, positioned inward from the long sides 30 of the beam 24. Spaced along each side wall 48 are indentations or cavities 50. Each cavity 50 has a corresponding or matching cavity directly across the passage 38. FIG. 6 depicts three cavities along each inner side wall 48, but there may be less or more depending on the specific requirements for use of the clip.

A third, sliding component of the clip is molded or otherwise manufactured from an electrically non-conductive plastic material. It is illustrated in various positions relative to the first and second components in FIGS. 1–4 and 6. The sliding component comprises a separate element or fastener having a flat, thin insertion part or plate 52 and an integral handle part or grip 54. The grip 54 is wider than the width of the plate 52 and thicker than the plate, and wider than the passage 38 in the beam 24. The grip 54 is illustrated as having a half-circular wall 56 adjoining a straight wall 58 from which the insertion plate 52 extends. Substantially flat, opposite facing gripping surfaces 60 are bounded by the upper and lower edges of the half-circular wall 56 and straight wall 58. On at least one of the gripping surfaces 60, an inner, half-circular ridge or groove 62 of smaller circumference provides an irregularity or roughness to the gripping surface, making it easier to hold onto the grip 54.

The insertion plate 52 is cantilevered from a central area of the straight wall 58 of the grip 54. It is sized and shaped to fit within the passage 38 of the beam 24. It has a first end 64 joined to the straight wall 58, a second, free end 66 and opposite edges 68 along an intermediate section or length of the plate. The edges 68 are parallel to each other until they approach the free end 66, where the edges 68 taper to a curved inward, semi-circular end face 70 similar in contour to the semi-circular contact surface 46 of the flange 44 in the beam aperture 32. The insertion plate 52 with end face 70 in effect form a second flange.

Each opposite edge 68 of the insertion plate, prior to the taper, has small, resilient, outwardly-directed projections or fingers 72. As best illustrated in FIG. 6, the fingers 72 are sized to be received in the cavities 50 within the inner side walls 48 of the passage 38 in the beam 24. The fingers are spaced apart the same distance as the cavities in each side wall are spaced apart. Each finger 72 has a corresponding or matching finger on the opposite plate edge 68, and the number of fingers on the edges of the insertion plate are the same as the number of cavities in the side walls of the passage. The resiliency of the fingers is such that they are flexible enough to deflect or bend under sufficient force without breaking.

In a vehicle environment where the clip 10 would be used to support and route a wire harness, a bolt or threaded weld stud would project from a vehicle panel or frame. To use the clip, the wire harness would be taped or otherwise secured to the cradle 12 at a position on the harness adjacent the stud. The insertion plate 52 would be removed from the passage 38 within the beam 24 by pulling on the grip 54, or at least withdrawn to a position where it would not interfere with insertion of the stud into the aperture 32.

The stud would be received in the aperture 32 of the beam 24 inward of the fixed flange 44. To secure the retainer part, and therefore the wire harness, to the vehicle at the predetermined location and at a specific height along the length of the stud, the beam 24 is moved to position the fixed flange 44 against the stud with the semi-circular contact face 46 of the flange between the selected threads. The grip 54 would be used to push the insertion plate 52 along the passage 38 such that the semi-circular end face 70 of the insertion plate contacts an opposite side of the stud between the selected threads. The stud is thereby clamped between the end face 70 of the insertion plate 52 and the contact face 46 of the fixed flange 44 within the beam 24.

The passage 38 acts as a guideway for the insertion plate 52. As the plate 52 moves along the passage, the resilient fingers 72 on the edges 68 of the plate sequentially snap into and out of the cavities 50 in the side walls 48 of the passage until the end face 70 of the insertion plate and the contact face 46 of the flange 44 clamp the stud. FIG. 3 shows a first example, wherein a larger diameter stud would prevent full insertion of the insertion plate but the retainer would securely hold the wire harness on the stud because at least one set of fingers 72 would be located in the cavities 50. FIGS. 4 and 6 show full insertion of the plate 52 for studs having a smaller diameter, wherein all the fingers 72 would be received in cavities 50. The fingers and cavities act as cooperating latch means to hold, in a releasable manner, the sliding component in a position securing the retainer on the stud. The fingers are sized and shaped to be flexible enough to deflect under a certain amount of force on the grip 54, but to remain in the selected cavities under forces applied on the retainer by the harness during vehicle operation.

The retainer part requires negligible insertion force because the sliding component would initially be in a position not interfering with receipt of the stud in the aperture. The size of the stud determines how far the sliding component is pushed into the passage of the stud retainer part. The correct set of locking fingers automatically snaps into the cavities that provide the tightest fit for the opposing flanges. Pulling on the grip of the sliding component allows the sliding component to be removed if the retainer needs to be removed from the stud, for example if the harness has to be serviced. The fingers and the clamping flanges do not break under reasonable separation forces. The force needed to separate the retainer part from the stud would also be negligible because the sliding component would first be moved out of contact with the stud.

The invention has the advantages of being easy to manufacture and relatively low in manufacture and material cost. Variations are possible. For example, the flange 44 in the beam 24 could be eliminated, though this could reduce locking efficiency. The passage 38 could be replaced by a track on the surface of the retainer part to guide the sliding component along the retainer part. Manual or other types of automatic releasable locks could be used in place of the flexible locking fingers. Rather than having flanges that fit between threads of the stud, the invention could be used to provide a simple friction fit to unthreaded fasteners. The clip may also be used to secure types of equipment other than wire harnesses to a specific location.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A retainer for securing a wire harness to a stud extending from a vehicle structure, the retainer comprising:
   means for attaching the retainer to the wire harness;
   a beam having a first, free end and a second end joined to the attaching means;
   an aperture in the beam through which the stud is inserted;
   a slot in the beam having an opening in the first end of the beam and an exit into the aperture;
   a flange element on the beam extending into the aperture opposite the slot exit for protruding between selected threads of the stud; and
   a sliding component separate from the beam having an insertion end for passing through the opening and slot and out the exit into the aperture, the sliding component insertion end including a semi-circular end face for contacting the stud and clamping the stud in the aperture, the end face being on a flange element of the sliding component for fitting between selected threads of the stud, whereby the stud is clamped between the flange element on the beam and the semi-circular end face on the flange element of the sliding component.

2. The retainer of claim 1 further comprising cooperating latch means on the sliding component and in the slot for latching the sliding component in a position within the slot that clamps the stud in the aperture.

3. The retainer of claim 2 wherein the cooperating latch means comprise at least one locking finger extending from the sliding component and at least one cavity in the beam communicating with the slot for receiving the at least one locking finger.

4. The retainer of claim 3 wherein there are multiple locking fingers and cavities for locking the sliding component in different positions within the slot depending on the size of the stud.

5. The retainer of claim 1 further comprising a gripping portion on the sliding component, whereby the sliding component can be removed from the slot.

6. The retainer of claim 5 wherein the gripping portion is wider than the slot.

7. A retainer comprising:
   a first part having first and second ends, an aperture extending through the first part adjacent the second end, and a passage extending through the first part from the first end to the aperture, the passage having inner side walls with indentations spaced along each inner side wall branching off from the passage into the side walls;
   a second part for insertion through the passage from the first end of the first part, the second part having an insertion end for protruding from the passage into the aperture, an intermediate section, and an opposite end for moving the insertion end and intermediate section through the passage, the insertion end having means for holding a bolt introduced into the aperture, the intermediate section having opposite edges with each edge having outwardly directed projections, selected indentations receiving selected projections to lock the second part in the first part with the holding means in a particular position within the aperture; and
   a third part integral with and extending from the first part for attachment to equipment intended to be held in a specific location by the retainer and bolt.

8. The retainer of claim 7 wherein the projections on the intermediate section of the second part are resilient fingers arranged to sequentially snap into and out of the indentations branching off from the passage in the first part until the holding means reaches the particular position in the aperture.

9. The retainer of claim 7 wherein the opposite end of the second part is wider than the passage, whereby the opposite end cannot enter the passage.

10. The retainer of claim 7 wherein the holding means on the insertion end of the second part is a flange element sized to fit between threads of the bolt.

11. The retainer of claim 10 further comprising another flange element on the first part extending into the aperture in a location that would be opposite the flange element on the insertion end of the second part.

12. The retainer of claim 7 wherein the third part has arms extending at right angles to the first part.

* * * * *